United States Patent
Abro et al.

(10) Patent No.: US 8,770,775 B2
(45) Date of Patent: Jul. 8, 2014

(54) LIGHTED CUP HOLDER ASSEMBLY

(75) Inventors: Lauren M. Abro, Farmington Hills, MI (US); Que-Whang Rhee, Ann Arbor, MI (US); Benjamin Warren Penner, Aiken, SC (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 277 days.

(21) Appl. No.: 13/432,850

(22) Filed: Mar. 28, 2012

(65) Prior Publication Data

US 2013/0258670 A1 Oct. 3, 2013

(51) Int. Cl.
*F21V 33/00* (2006.01)
*B60N 3/10* (2006.01)
*B60Q 3/00* (2006.01)

(52) U.S. Cl.
USPC ......... 362/101; 362/488; 248/311.2; 224/926

(58) Field of Classification Search
CPC .............................. B60N 3/101; B60Q 3/0243
USPC ................. 362/101, 488; 248/311.2; 224/926
See application file for complete search history.

(56) References Cited

U.S. PATENT DOCUMENTS

| | | | |
|---|---|---|---|
| 5,590,945 A | 1/1997 | Simms | |
| 5,915,832 A | 6/1999 | Baird, Sr. | |
| 6,092,905 A | 7/2000 | Koehn | |
| 6,193,399 B1 | 2/2001 | Hulse | |
| 6,848,817 B2 | 2/2005 | Bos et al. | |
| 6,896,387 B2 | 5/2005 | Renfro | |
| 7,322,500 B2 | 1/2008 | Maierholzner | |
| 7,429,068 B2 | 9/2008 | Busha et al. | |
| 7,654,680 B2 | 2/2010 | Kukucka et al. | |
| 7,708,436 B2 | 5/2010 | Lota | |
| 7,766,293 B2 * | 8/2010 | Seidl et al. ................ | 248/311.2 |
| 7,810,969 B2 | 10/2010 | Blackmore et al. | |
| 2008/0266853 A1* | 10/2008 | Goto ............................ | 362/240 |
| 2011/0037287 A1 | 2/2011 | Penner | |
| 2011/0261579 A1* | 10/2011 | Anderson et al. ............ | 362/551 |
| 2011/0273865 A1* | 11/2011 | Robbins ....................... | 362/101 |

FOREIGN PATENT DOCUMENTS

| | | |
|---|---|---|
| DE | 202005004257 U1 | 5/2005 |
| DE | 102006055839 A1 | 6/2007 |
| JP | 09272377 A | 10/1997 |

* cited by examiner

*Primary Examiner* — Karabi Guharay
(74) *Attorney, Agent, or Firm* — Gifford, Krass, Sprinkle, Anderson & Citkowski, P.C.

(57) ABSTRACT

A cup holder assembly having a storage compartment adapted to receive a beverage container is provided. The storage compartment includes a recessed portion, and a top ring having a bottom planar surface is mounted onto the recessed portion. The recessed portion further includes a radiused inner edge exposed to the space of the storage compartment. A light source is mounted along the radiused inner edge. Light from the light source is reflected from the planar surface onto the radiused inner edge. A light shield extends beneath the bottom planar surface of the top ring so as to shield the light source from view of the passengers and driver of the vehicle yet allow light to pass from the light source onto the radiused inner edge of the cup holder assembly.

9 Claims, 4 Drawing Sheets

LIGHTED CUP HOLDER ASSEMBLY

FIELD OF THE INVENTION

The invention relates to a cup holder assembly. More particularly, the invention relates to a cup holder assembly having a light source hidden from view wherein light from the light source is pooled around the opening of the cup holder.

BACKGROUND OF THE INVENTION

Cup holder assemblies may be found in automotive vehicles. In some instances the cup holder assemblies are illuminated so as to facilitate the insertion of a beverage container into the cup holder. However, in current cup holder assemblies the light source may be visible to the passengers of the vehicle. Accordingly, it remains desirable to have a cup holder assembly wherein the opening of the cup holder is illuminated yet the light source may not be seen by the users. Furthermore, it remains desirable to have a cup holder assembly wherein light from the light source is pooled along the opening edge of the cup holder to provide an aesthetically pleasing view, and guide the insertion of a beverage container into the cup holder.

SUMMARY OF THE INVENTION AND ADVANTAGES

A cup holder assembly for use in an automotive vehicle is provided. The cup holder assembly includes a storage compartment having an opening for receiving a beverage container. The storage compartment includes an inner wall having a surface bounding a space. The space is configured to hold the beverage container. The inner wall includes an upper edge portion bounding the opening.

The upper edge portion has a radiused inner edge exposed to the space. The radiused inner edge is convex with respect to the inner space of the storage compartment. More specifically, the radiused inner edge curves towards the space and the opening of the storage compartment.

A lip extends outwardly from the upper edge portion so as to form a flange. A second wall extends upwardly from the lip. The second wall extends around the opening of the storage compartment. The second wall bounds an area defined by the distal edge of the lip.

The storage compartment includes a top ring bounding the periphery of the opening. The top ring includes an inner peripheral edge and a distal edge. A bottom planar surface faces the bottom of the radiused inner edge. The top ring is dimensioned so as to be fittingly mounted onto the second wall wherein the inner peripheral edge of the top ring is generally dimensioned to be the same as the opening of the storage compartment.

A light source is mounted along the lip and disposed underneath the top ring. The light source may be a waveguide in the form of a ring. The ring is configured to be seated on the lip of the upper edge portion and may abut against the second wall. The planar surface directs light from the light source onto the radiused inner edge so as to pool the light along the radiused inner edge and provide an aesthetic look. More specifically, the light from the light source is collected along the radiused inner edge and generally diffused such that a concentration of light may be found along the center portion of the radiused inner edge and diffused outwardly therefrom.

The top ring further includes a light shield disposed annularly along an inner edge of the top ring. A portion of the light shield extends below the bottom planar surface of the top ring. A bottom edge of the light shield is spaced apart the radiused inner edge so as to define an opening between the bottom edge of the light shield and the surface of the radiused inner edge. Accordingly, the light shield is operable to hide the light source from the view of a user but to allow light from the light source to pass into the space of the storage compartment.

The light shield may further include an inner face opposite an outer face. The outer face of the light shield is exposed to the space of the storage compartment. The inner face of the light shield faces the light source. The inner face may be radiused so as to direct light from the light source onto the radiused inner edge of the upper edge portion of the storage compartment.

The light shield is further configured to hide the light source from view of a passenger seated within the vehicle. The bottom edge of the light shield does not extend towards the space of the storage compartment beyond a plane defined by an axis angled at least 41 degrees from a planar surface of the lip. The light shield may further include a side wall disposed opposite the distal peripheral edge of the top ring. The light shield includes a light wall having a convex surface with respect to the space of the storage compartment. A portion of the side wall extends upwardly beyond a top surface of the top ring. The light shield may be formed from a reflective material. More specifically, the light shield may include an outer surface formed from a reflective material such as chrome.

The cup holder assembly may further include a housing. The housing includes a top planar surface having a peripheral inner edge defining a second opening. The second opening is adapted to receive the storage compartment. The housing may further include a housing side wall configured to mount onto a storage compartment of an automotive vehicle.

The housing may be covered with a layer of material such as leather, synthetic leather, or a fabric so as to provide an aesthetically pleasing look to the user as well as comfort upon physical contact. As discussed above, the light source may be a light ring adapted to fit along the lip of the storage compartment and beneath the planar surface of the top ring.

The light ring may include a channel adapted to guide light around the circular light ring so as to present a uniform distribution of light throughout the light ring. The light ring may be adapted to fit along the lip of the storage compartment and beneath the planar surface of the top ring so as to direct light inwardly from the light ring towards the radiused inner edge of the storage compartment. The inner edge of the storage compartment may extend along a radius between X and Y.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

Figure 1:
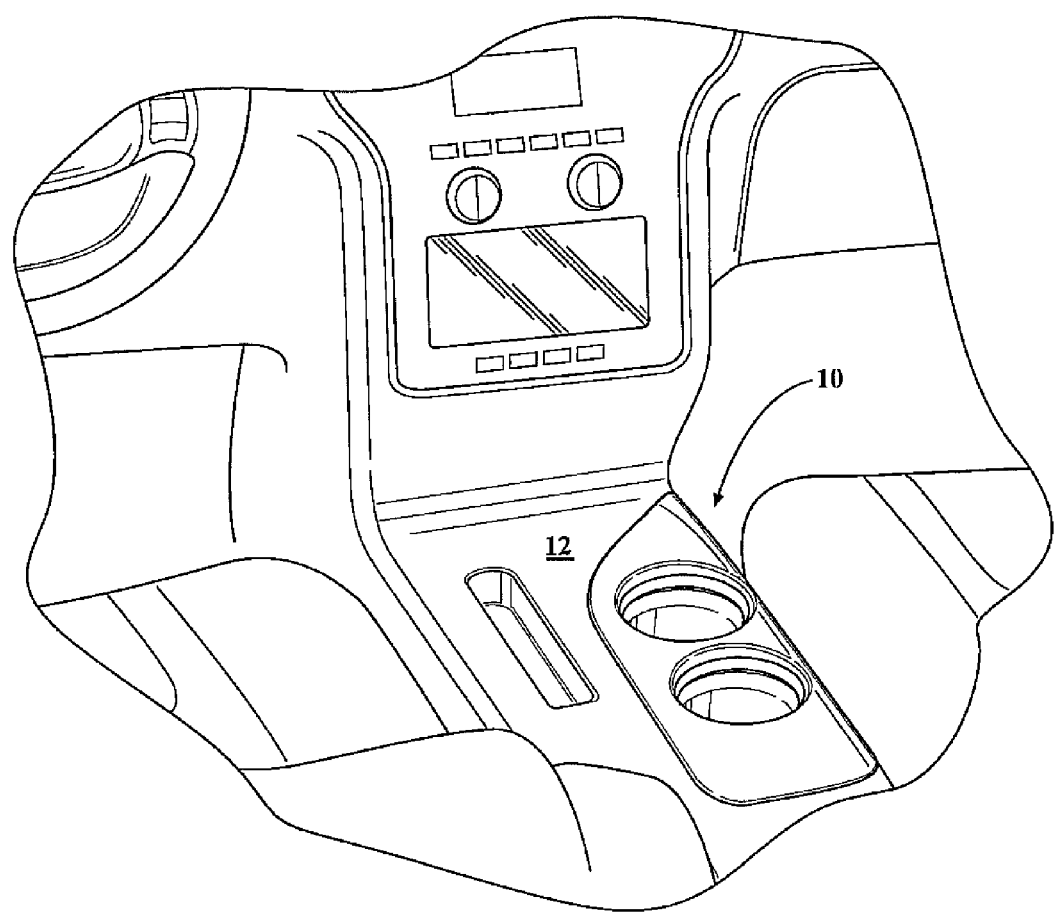
FIG. 1 is a perspective view of the cup holder assembly used in an automotive vehicle.
Figure 2:
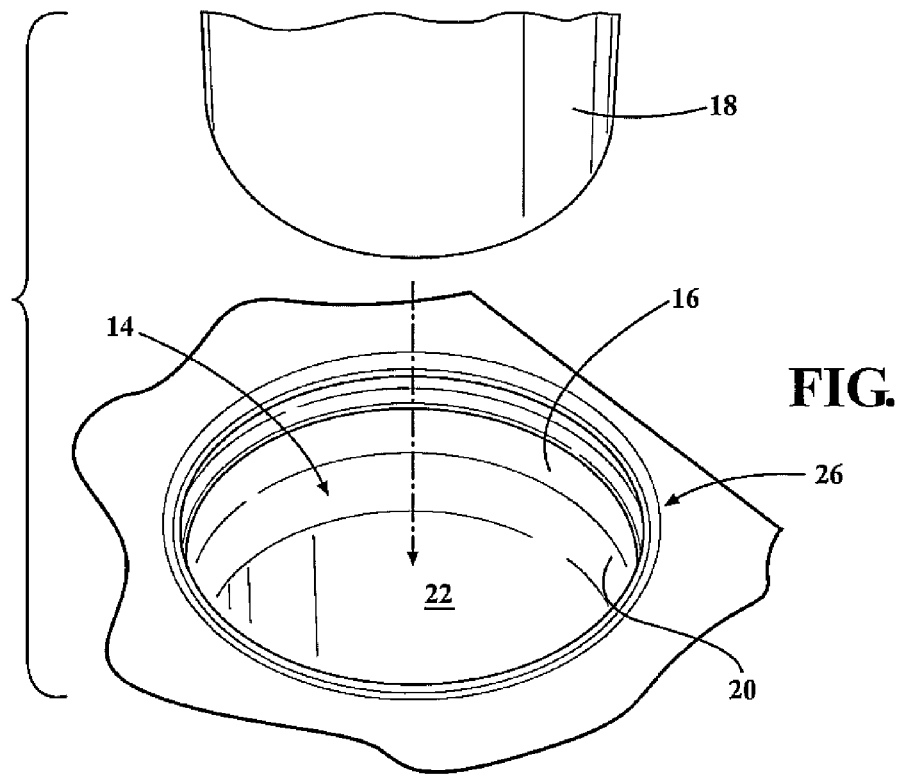
FIG. 2 is an isolated view of the cup holder assembly.
Figure 3:
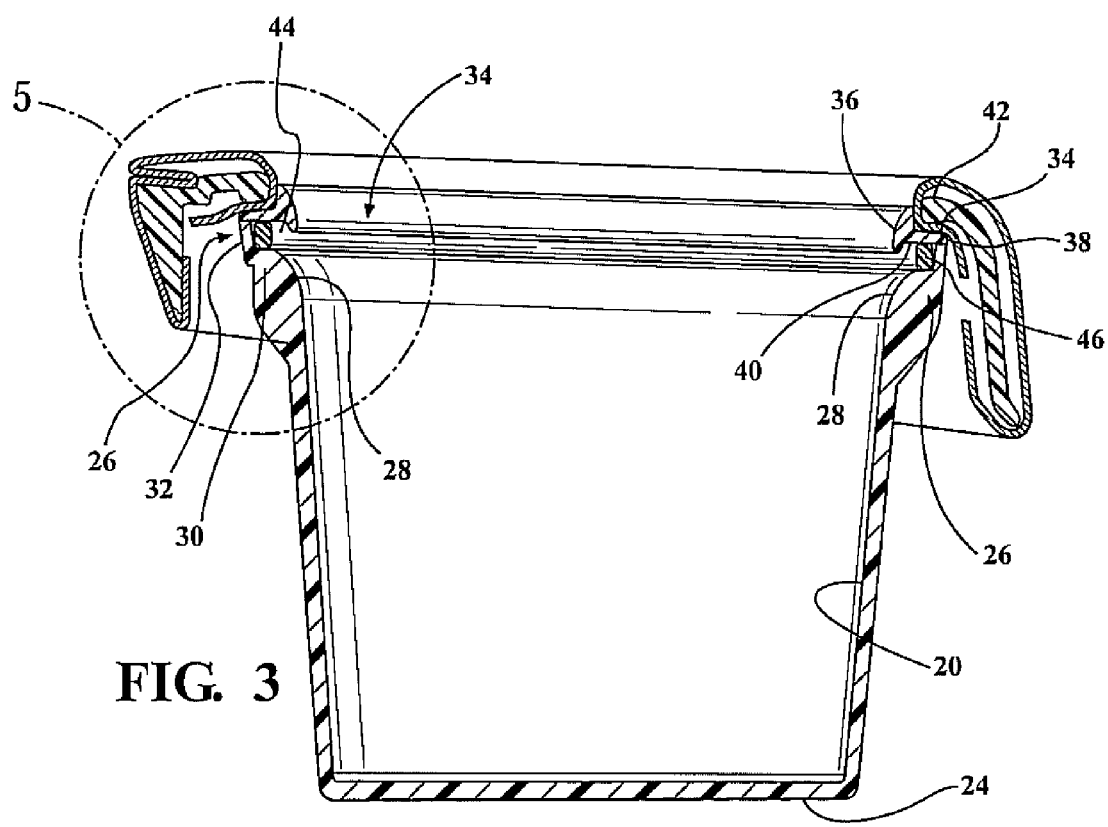
FIG. 3 is a cross section of FIG. 2 taken along lines 3-3.

With reference now to FIGS. 1-5, a cup holder assembly 10 is provided. The cup holder assembly 10 may be used in an automotive vehicle and mounted onto a vehicle console 12 assembly. The cup holder assembly 10 includes a storage compartment 14 having an opening 16 for receiving a beverage container 18.

The storage compartment 14 may be formed from a polymer through injection molding processes currently known and used in the art. The storage compartment 14 includes an inner wall 20 having a surface bounding a space 22 configured to hold the beverage container 18. The storage compartment 14 may further include a bottom wall 24 opposite the opening 16.

The inner wall 20 includes an upper edge portion 26 bounding the opening 16. The upper edge portion 26 includes a radiused inner edge 28 exposed to the space 22. The radiused inner edge 28 is generally convex with respect to the space 22. Specifically, the radiused inner edge 28 curves towards the space 22 and the opening 16 of the storage compartment 14. The radiused inner edge 28 is operable to collect light so as to pool light along the radiused inner edge 28 and provide an aesthetic look to the illuminated storage compartment 14. The radiused inner edge 28 extends along a surface and is generally arcuate so as to pool light thereon.

The storage compartment 14 further includes a lip 30 extending radially from the upper edge portion 26. A second wall 32 extends upwardly from the distal end of the lip 30. A top ring 34 having an inner peripheral edge 36 opposite an outer distal edge 38 is provided. The top ring 34 includes a bottom planar surface 40 opposite a top planar surface 42. The bottom planar surface 40 is fitted onto the second wall 32 so as to be spaced apart from a top surface of the lip 30. The outer distal edge 38 of the top ring 34 is mounted on top of the second wall 32 of the storage compartment 14 so as to form a recess 44.

A light source 46 is mounted within the recess 44. The light source 46 is fitted along the lip 30 and underneath the top ring 34. The planar surface 48 of the top ring 34 directs light from the light source 46 onto the radiused inner edge 28 so as to pool light along the radiused inner edge 28 of the cup holder assembly 10.

The top ring 34 may further include a light shield 50 disposed annularly along an inner edge of the top ring 34. The light shield 50 may be formed integrally with the top ring 34. The light shield 50 extends below the bottom planar surface 40 of the top ring 34 with respect to an upright orientation of the cup holder assembly 10. A bottom edge 52 of the light shield 50 is spaced apart the radiused inner edge 28 so as to define an opening 16. The light shield 50 is configured so as to block the light source 46 from the view of a passenger or driver of the vehicle yet to allow light from the light source 46 to pass into the space 22 of the storage compartment 14.

The light shield 50 includes an inner face 54 opposite an outer face 56. The outer face 56 of the light shield 50 is exposed to the space 22 of the storage compartment 14 so as to be seen by users of the vehicle. The inner face 54 faces the light source 46. A portion of the inner face 54 is radiused so as to curve toward the light source 46. Accordingly, the radiused inner face 54 is operable to further direct light onto the radiused inner edge 28 of the storage compartment 14.

Figure 5:
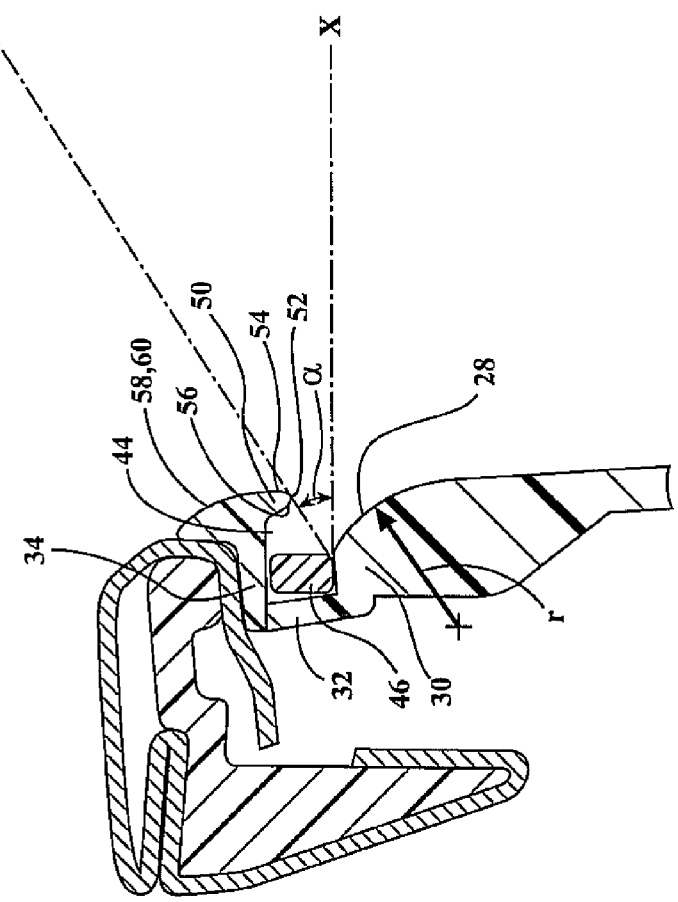
FIG. 5 is an isolated view showing a cross section in perspective of the top ring and the light source.

The bottom edge 52 of the light shield 50 does not extend beyond a plane defined by an axis angled "x" which is no more than 41 degrees from a planar surface 48 of the lip 30 defined by the line labeled X, as shown in FIG. 5. More specifically, the light shield 50 extends below the planar surface 48 of the top ring 34 so as to hide the light source 46 from view of a passenger or driver in the respective driver seat or passenger seat of the vehicle.

The light shield 50 may further include a side wall 58 having a convex surface with respect to the space 22. A portion of the side wall 60 extends upwardly beyond a top surface of the top ring 34. The light shield 50 may be formed from a reflective material so as to help shine and distribute the light in the visible spectrum. The light shield 50 may include an outer surface formed from a reflective material such as chrome, metal, or the like.

Figure 4:
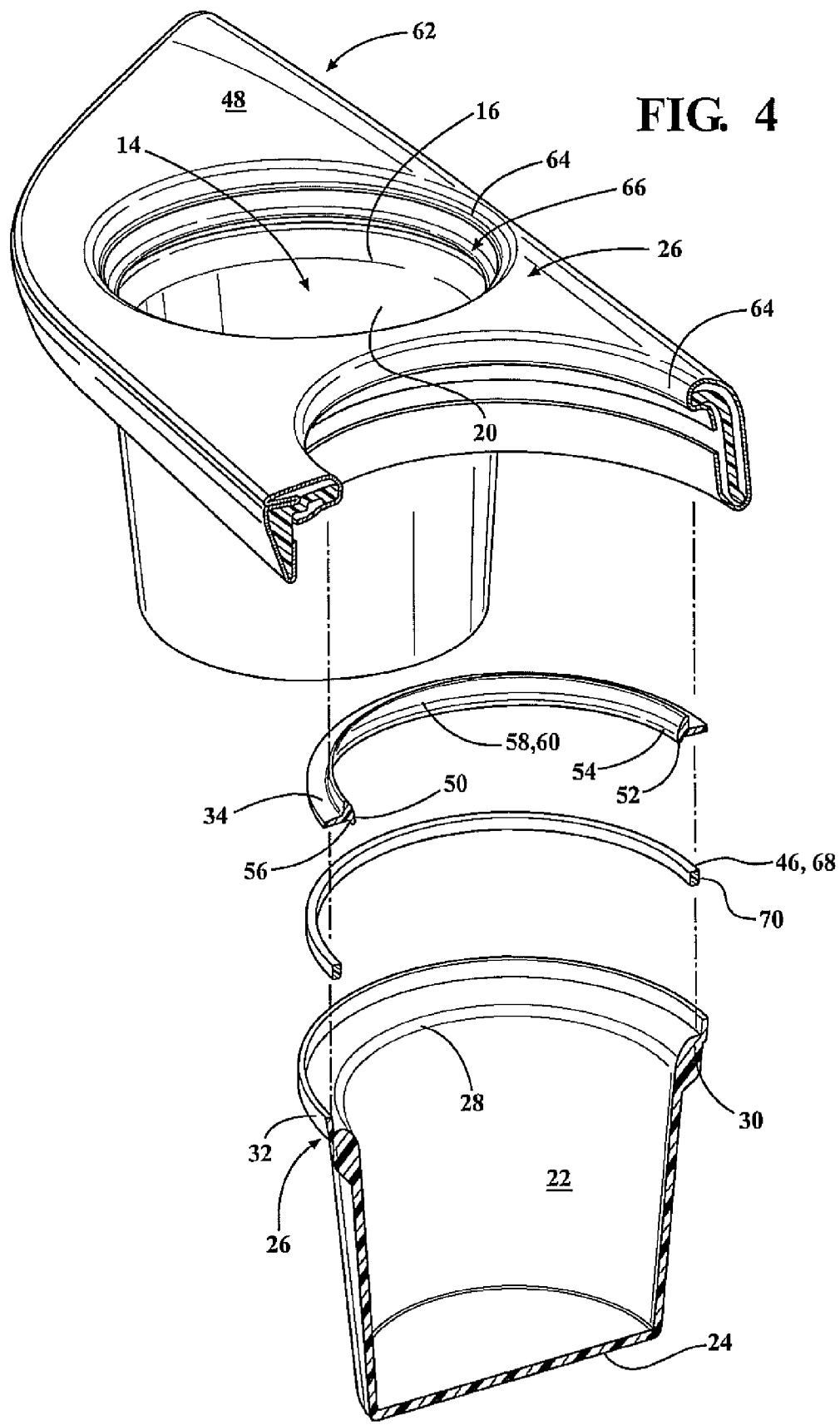
FIG. 4 is a perspective view of a cup holder assembly having a housing.

With reference now to FIGS. 1, 4 and 5, the cup holder assembly 10 may further include a housing 62. The housing 62 may be formed of a polymer or composite through an injection molding process. The housing 62 includes a planar surface 48 having a first peripheral inner edge 64. The first peripheral inner edge 64 forms a second opening 66 dimensioned generally similar to the opening 16 of the storage compartment 14.

The housing 62 may be covered with a material such as fabric or leather. The storage compartment 14 may be attached underneath the undersurface of the housing 62 and attached to the housing 62 using an adhesive or a mechanical fastener such as a screw, vibrational welding, or the like.

An outer edge portion of the housing 62 may be adapted to mount onto a vehicle console 12. The light source 46 may be a light ring 68 also referenced in the art as a wave guide. The wave guide includes a channel 70 configured to guide light through the body of the wave guide so as to effect a uniform distribution of light throughout the body.

The light ring 68 may be adapted to fit within the recess 44 of the storage compartment 14. More specifically, the light ring 68 is fitted onto the lip 30 of the upper edge portion 26 adjacent the second wall 32 and underneath the bottom planar surface 40 of the top ring 34. Thus, light from the wave guide is projected inwardly towards the space 22 of the cup holder. Light may be further directed by the bottom planar surface 40 of the top ring 34 and more specifically by the inner face 54 of the light shield 50 so as to pool onto the radiused inner edge 28 of the storage compartment 14 and provide an aesthetically pleasing look to the cup holder assembly 10 when illuminated.

With reference now to FIG. 5, a cross section of the cup holder assembly 10 is provided. The cup holder assembly 10 includes a radiused inner edge 28 which is generally arcuate so as to pool light thereon. The radiused inner edge edges from a radius, labeled "r" which is 8.5 mm long from a center point indicated by the cross-hair. The radius is illustrative and should not be read to be limiting. It is appreciated by those skilled in the art that the length of the radius from the center point may be longer or shorter depending on the amount or intensity of light desired to be pooled on the radiused inner edge 28. For instance, in cases where it is desired to have a more concentration of light pooled on the radiused inner edge 28, the radius may be shorter, whereas the radius may increase to provide less concentration of pooled light.

Obviously many modifications and variations of the present invention are possible in light of the above teachings and may be practiced otherwise than as specifically described while within the scope of the appended claims.

The invention claimed is:

1. A cup holder assembly comprising:
a storage compartment having an opening for receiving a beverage container, the storage compartment having an inner wall surface bounding a space configured to hold the beverage container, the inner wall surface including an upper edge portion bounding the opening, the upper edge portion having a radiused inner edge exposed to the space, the radiused inner edge curved towards the space and opening of the storage compartment, a lip extending radially from the upper edge portion, and a second wall extending upwardly from the lip;

a top ring having a planar surface facing the radiused inner edge, the top ring including a distal edge covering the second wall of the storage compartment;

a light source mounted along the lip and underneath the top ring, the planar surface directing light from the light source onto the radiused inner edge so as to pool the light along the radiused inner edge.

2. The cup holder assembly as set forth in claim 1, wherein the top ring includes a light shield disposed annularly along an inner edge of the top ring, the light shield extending below the planar surface of the top ring, a bottom edge of the light shield spaced apart the radiused inner edge so as to block the light source from view but allow light to pass onto the space.

3. The cup holder assembly as set forth in claim 2, wherein the light shield includes an inner face opposite an outer face, the outer face of the light shield exposed to the space, the inner face facing the light source, the inner face is radiused so as to curve toward the light source.

4. The cup holder assembly as set forth in claim 3, wherein a bottom edge of the light shield does not extend towards the space of the storage compartment beyond a plane defined by an axis angled x degrees from a planar surface of the lip.

5. The cup holder assembly as set forth in claim 4, wherein the light shield includes a side wall having convex surface with respect to the space, a portion of the side wall extending upwardly beyond a top surface of the top ring.

6. The cup holder assembly as set forth in claim 2, wherein the light shield is formed from a reflective material.

7. The cup holder assembly as set forth in claim 6, wherein the light shield includes an outer surface formed from chrome.

8. The cup holder assembly as set forth in claim 1, further including a housing, the housing having a first peripheral inner edge defining a second opening, the second opening adapted to receive the storage compartment.

9. The cup holder assembly as set forth in claim 1, wherein the light source is a light ring adapted to fit along the lip of the storage compartment and beneath the planar surface of the top ring.

\* \* \* \* \*